United States Patent
Haisfield

[11] 3,891,961
[45] June 24, 1975

[54] SONAR COUNTERMEASURE
[75] Inventor: Rudolph M. Haisfield, Silver Spring, Md.
[73] Assignee: The United States of America as represented by the Secretary of the Navy, Washington, D.C.
[22] Filed: Feb. 27, 1961
[21] Appl. No.: 92,101

[52] U.S. Cl. ............................. 340/5 R; 340/5 D
[51] Int. Cl.² ................................... H04B 11/00
[58] Field of Search .............. 340/5, 6, 3, 16, 5 D; 181/.51, .59, 26, .5; 343/18, 100.6

[56] References Cited
UNITED STATES PATENTS
| | | | |
|---|---|---|---|
| 1,384,029 | 7/1921 | Fessenden | 340/5 |
| 2,397,107 | 3/1946 | Hammond, Jr. | 340/5 R |
| 2,429,726 | 10/1947 | Lewis | 343/100 SA |
| 3,002,188 | 9/1961 | Abbot | 343/100 SA |
| 3,016,513 | 1/1962 | Van Dyke | 340/3 R |

OTHER PUBLICATIONS

A Testbook of Sound, by A. B. Wood, The Macmillan Co., New York, 1955, QC225w6 pp. 325–331.

*Primary Examiner*—Richard A. Farley
*Attorney, Agent, or Firm*—R. S. Sciascia; Arthur L. Branning

EXEMPLARY CLAIM

1. A sonar countermeasure comprising, a first and second sonar transducer, a broadband source of signals coupled to each of said transducers, said transducers being rigidly interconnected and separated by a plurality of wavelengths at the lowest frequency within the band of said source, and continuously variable phasing means to adjust the frequency of the signal supplied to each of said transducers to a different value differing by less than 1 cycle per second.

11 Claims, 5 Drawing Figures

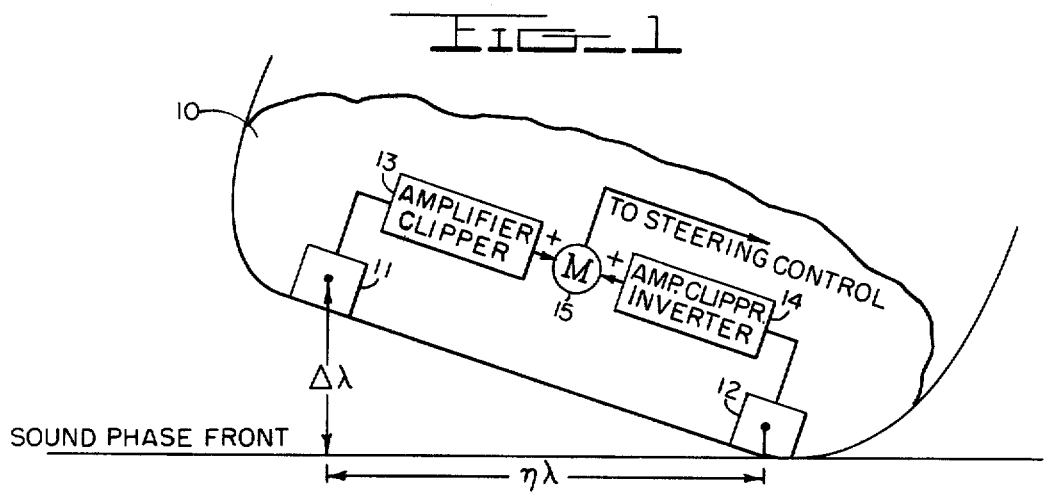
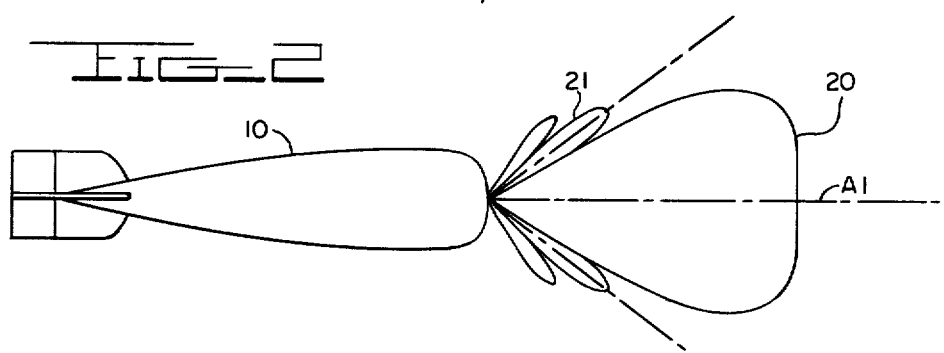
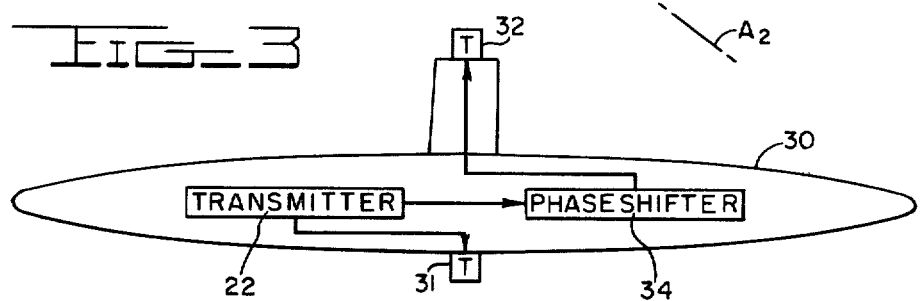
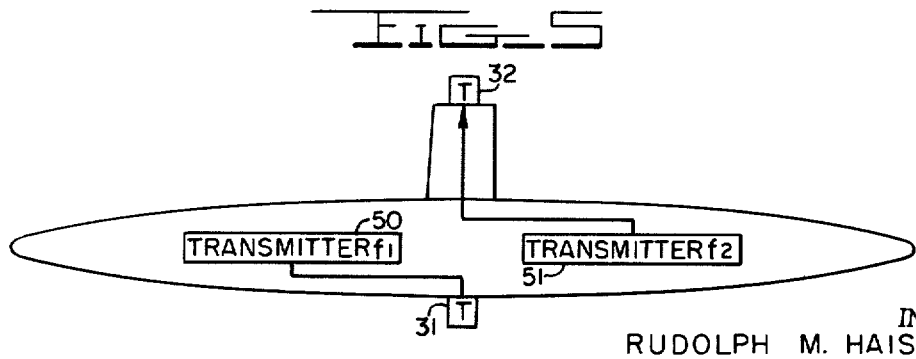

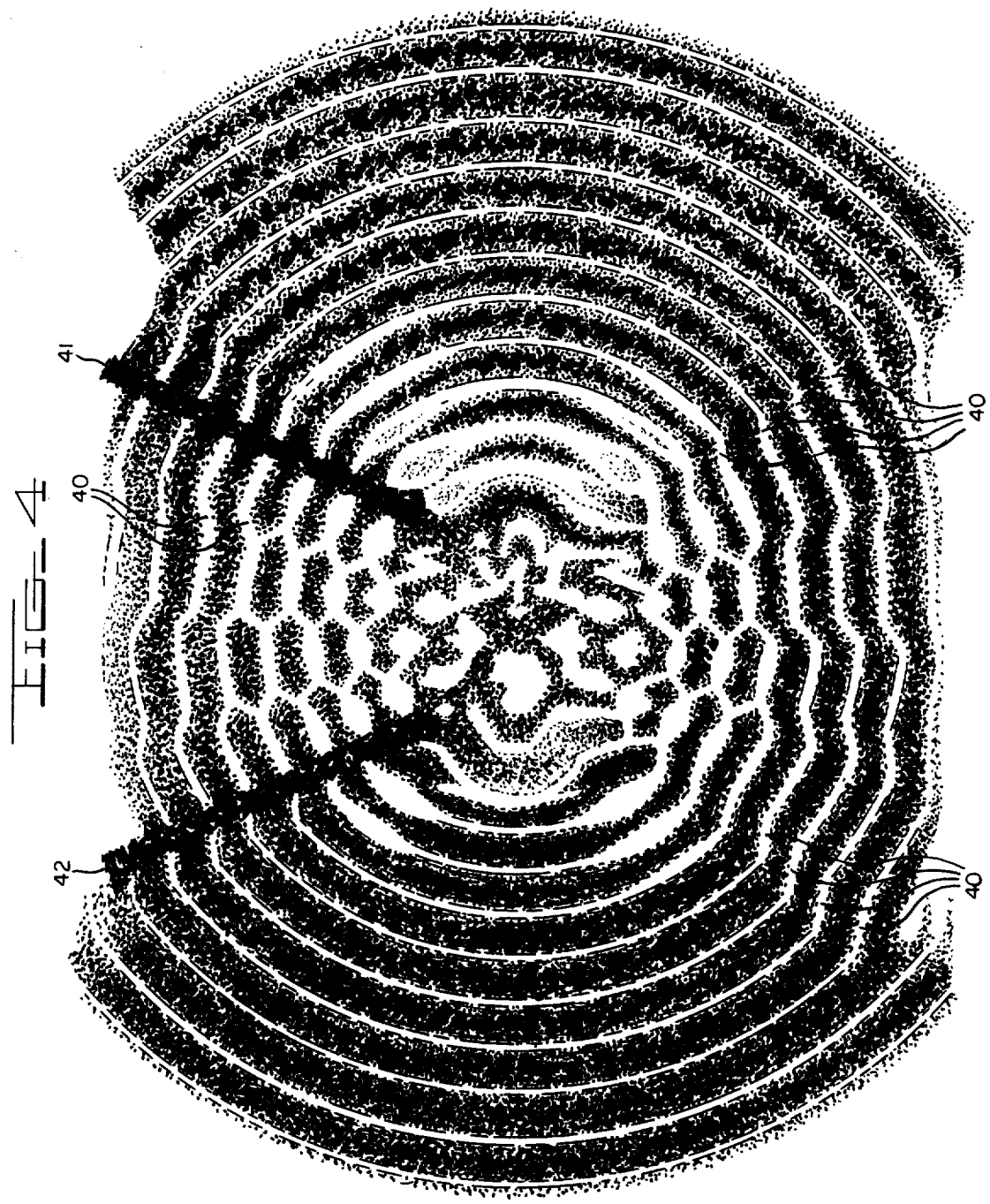

SONAR COUNTERMEASURE

The invention described herein may be manufactured and used by or for the Government of the United States of America for governmental purposes without the payment of any royalties thereon or therefor.

The present invention relates to a sonar countermeasure for use against active or passive sonar equipment. More specifically the invention relates to a countermeasure for active or passive torpedoes that home on sound sources.

The passive homing torpedo presents, perhaps, one of the greatest hazards to surface and undersea vessels in the event of war. These weapons are easily released from aircraft, speedy surface craft, or submarines at great distances from the target. They are sufficiently quiet and swift that by the time they are detected evasive tactics may be useless.

Instead of evading, the customary procedure is to remain silent in the hope that the weapon has not obtained sufficient data to score a hit. With the development of better sonar receivers and small computing structures for use therewith, this possibility is becoming increasingly remote. There is also the possibility of the torpedo's shifting to an active search phase based on the passive date.

An object of the present invention, therefore, is to provide a sonar system to deceive a sonar-receiver.

A further object of the invention is to provide a sonar device for deceiving a sound homing torpedo.

These and other objects of the present invention are best understood with reference to the accompanying drawings wherein:

FIG. 1 shows the general structure of the head of a conventional sound homing torpedo;

FIG. 2 shows the receiving pattern of a torpedo as shown in FIG. 1;

FIG. 3 shows a vessel equiped with the sonar countermeasure of the present invention;

FIG. 4 shows the radiation pattern from the countermeasure of FIG. 3; and

FIG. 5 shows a second embodiment of the countermeasure according to the present invention.

FIG. 1 shows the transducer head of a typical passive sound homing torpedo. The head is designed to operate at a high center frequency and contains two spaced hydrophones 10 and 11. The hydrophones are preferably spaced several wavelengths apart at the lowest frequency of operation. When a sound phase front strikes the head of the torpedo at an angle, as shown, there is a delay $\Delta\lambda$ between the signal received at hydrophone 11 compared with that received at hydrophone 12.

The signals arriving at the two hydrophones are used to control the steering of the torpedo. The signal from a first hydrophone is amplified and clipped by a processing circuit 13. The signal from the remaining second hydrophone is amplified clipped at the same level as that from the first and inverted with respect thereto. Both signals are then combined by a summer 15. If the phase front struck both hydrophones simultaeously both signals would cancel and no control signal emerges from the summer 15. In the illustrated case, however, the delay $\Delta\lambda$ results in incomplete cancellation and a signal issues from the summer 15 to operate a rudder or steering gear to turn the torpedo until it is normal to the wavefront. Such systems are notoriously old in the art and further discussion herein is therefore deemed unnecessary.

FIG. 2 shows the receiving pattern of this type of hydrophone arrangement. In general many pairs of hydrophones are used; and the pattern, familiar to all those skilled in the wave communication art, is a large center lobe 20 of high sensitivity about an axis A, and smaller secondary lobes such as the second order lobe 21 centered about the axis $A_2$. This lobe occurs, for example, when $\Delta\lambda$ approaches a wavelength.

The secondary lobe offers a means of misdirecting the torpedo, since in a certain phase of operation the weapon can not distinguish a signal received along the axis therein from the signal along the axis of the primary lobe 20. To prevent this the weapon follows a preselected program. At great distances from the target the weapon is in a hunting phase and sweeps its lobes over the target through an angle greater than any covered by a secondary lobe. These lobes, therefore, cannot acquire a target. After acquiring a target in the main lobe, hunting is then reduced to a minimum.

The operation of this system is based on the belief that a sound phase front always travels normal to its direction of propagation from its source. The torpedo can thus keep itself directed with its $A_1$ axis toward the source simply by slight turning motions and evasive tactics by the target are not very effective.

The present invention is based on the discovery that equal phase fronts are not always normal to their direction of propagation. A phenomenon known as "phase front tilt" has been observed in the phase fronts of two or more spaced sources.

As shown in FIG. 3 the sources 31 and 32 may be placed centrally at the bottom of a submarine 30 for example, and at the conning tower or sail. A single transmitter 22 supplies the driving signals for both transducers. The signal to one transducer passes through a phase shifter 34. The phase shifter, for example, may be of the mechanical type, preferably capable of 360° operation. Since adjustment of the phase shifter may prove to be tedious, a motor and suitable speed reduction means is convenient for this purpose.

FIG. 4 shows the wave pattern produced by two wave sources of the same frequency spaced apart several wavelengths in water. The number in practice is preferably in the hundreds. The water was contained in a glass bottomed tank and the pattern observed by passing light upward through the water and tank. The phase front tilt is observed at point 40, for example. It is further obvious that the tilt becomes more pronounced in the near field of the sources. Tilts of opposite slope also appear to be present in the same angular sectors but these have not been verified theoretically.

The two apparently calm areas 41 and 42 are shadows of two transducer arms supplying the sound energy.

When the torpedo hydrophones are located in this angular sector the torpedo will be directed away from the target. The chance that the hydrophones will be in this sector is small for the fixed pattern of FIG. 4. If, however, the hydrophones are moved relative to one another the pattern will shift so that the hydrophones will always be in this sector part of the time. With active torpedo systems the frequency of operation is adjusted to that of the torpedo. For passive torpedo systems a plurality of frequencies or typical prerecorded submarine noise is fed to the transducers.

The transducers 31 and 32 are located at the top and bottom of the submarine so that the tilted wavefronts will occur near a horizontal plane containing the submarine, since attacks are expected in these areas rather than from directly above or below. It is also easier to deflect the weapon to miss up or down, than from bow to stern for example. To maintain this pattern it is preferable to maintain the orientation axis between the transducers, changing the pattern by moving the transducers along that axis.

The transducer movement need not be mechanical, but may be accomplished by the phase-shifter 34. The pattern may be shifted in this manner so that the angular areas between the sectors in FIG. 3 are all covered at one time or another. The phase shift must proceed slowly so that the hydrophones and steering circuit members, such as servomotors and the like, will have time to respond. A suitable continuous phase shift is provided by altering the frequency supplied to one transducer by less than a cycle per second. In at least one case a cycle per minute was found satisfactory.

The exact manner in which the torpedo is deflected is not known. It is believed, however, that the highly distorted wave fronts in the near field cause a sudden shift in course, and the inertia in the steering system prevents the weapon from reorienting itself in time to strike the target. There is some evidence that side lobe capture may be effected, since it was difficult to lure the weapon into a reattack even by deactivating one transducer. The transducers placed more sound energy in the water than would the submarine under normal conditions, i.e. 10 watts per transducer.

FIG. 5 shows a second embodiment of the invention in which each transducer is driven from a separate transmitter. The design of the transmitters may be the same since the difference in frequency is so small. The real problem is making sure that the frequency difference is not too large. If the transmitters are very stable and adjustable in frequency, monitor means may be provided to compare the two signals. The conventional method of monitoring is to provide a peak clipper and integrating circuit in the output of one transmitter and a peak clipper with a differentiating circuit in the output of the other. The resulting signals are then applied to the X and Y inputs of a cathode ray tube or similar display device. The displayed signal is a narrow pulse which drifts to one side or the other of the display device depending on the direction of the frequency difference and at a speed depending on the magnitude of that difference. The least perceptible drift is desired in the present structure.

Obviously many modifications and variation of the present invention are possible in the light of the above teachings. It is therefore to be understood that within the scope of the appended claims the invention may be practiced otherwise than as specifically described.

What is claimed is:

1. A sonar countermeasure comprising, a first and second sonar transducer, a broadband source of signals coupled to each of said transducers, said transducers being rigidly interconnected and separated by a plurality of wavelengths at the lowest frequency within the band of said source, and continuously variable phasing means to adjust the frequency of the signal supplied to each of said transducers to a different value differing by less than 1 cycle per second.

2. A countermeasure according to claim 1 wherein said phasing means comprises a mechanical phase shifter.

3. A countermeasure according to claim 1 wherein said source comprises a substantially identical pair of highly stable oscillators adjustable in frequency and said phasing means includes a display means for measuring the relative drift between said oscillators.

4. A countermeasure according to claim 1 wherein said source includes a waveform generating means for producing in conjunction with said transducers a sound typical of a submarine.

5. A countermeasure according to claim 1 wherein said first and second transducers separately radiate omni-directional patterns.

6. The method of deflecting a sonar weapon which orients itself normal to equiphase fronts of sound waves received from a target comprising, radiating a first signal of a given frequency from a first point on said target, radiating a second signal of substantially the same frequency from a second point spaced from said first point by a plurality of wavelengths of said given frequency and continuously varying the relative phase between said first and second signals at the approximate rate of 1 cycle per minute.

7. A sonar countermeasure comprising, in combination with a naval vessel, a first and second sonar projector, a source of signals coupled to said first projector, a source of similar signals connected to said second projector, said projectors being mounted on points on said vessel that are spaced by a plurality of wavelengths, and means coupled to said projectors to continuously vary the phase of the signal generated by said second projector relative to said first projector as measured at said first projector by less than one wavelength per second.

8. A countermeasure according to claim 7 wherein said projectors are connected to the same signal source and said phasing means comprises a continuously variable phase shifter interposed in the input of said second projector.

9. A countermeasure according to claim 7 wherein said projectors are connected to separate signal sources and said phasing means includes means to adjust the frequencies of said generators to a difference of less than one cycle per second.

10. A countermeasure according to claim 7 wherein said projectors are connected to the same signal source and said phasing means comprises means to vary the apparent spacing between said projectors continuously less than one wavelength per second.

11. A countermeasure according to claim 9 wherein said projectors separately generate omnidirectional patterns.

* * * * *